United States Patent
Kadobayashi

(10) Patent No.: US 10,235,311 B2
(45) Date of Patent: Mar. 19, 2019

(54) DATA ACQUISITION SYSTEM, ELECTRONIC DEVICE, AND DATA ACQUISITION TERMINAL

(71) Applicant: KYOCERA Document Solutions Inc., Osaka-shi, Osaka (JP)

(72) Inventor: Izumi Kadobayashi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 291 days.

(21) Appl. No.: 15/041,281

(22) Filed: Feb. 11, 2016

(65) Prior Publication Data

US 2016/0239447 A1 Aug. 18, 2016

(30) Foreign Application Priority Data

Feb. 17, 2015 (JP) .................................. 2015-028703

(51) Int. Cl.
  *G06F 13/38* (2006.01)
  *G06F 13/42* (2006.01)
  *G06F 1/26* (2006.01)

(52) U.S. Cl.
  CPC ............ *G06F 13/385* (2013.01); *G06F 1/266* (2013.01); *G06F 13/4282* (2013.01)

(58) Field of Classification Search
  None
  See application file for complete search history.

(56) References Cited

U.S. PATENT DOCUMENTS

| | | | |
|---|---|---|---|
| 6,904,373 B2 * | 6/2005 | Le ........................... | G06F 1/266 |
| | | | 340/333 |
| 8,862,803 B2 * | 10/2014 | Powers ................. | G06F 13/385 |
| | | | 710/306 |
| 2008/0177926 A1 * | 7/2008 | Minami .............. | G06F 11/0748 |
| | | | 710/316 |

FOREIGN PATENT DOCUMENTS

| | | |
|---|---|---|
| JP | 2008-176564 A | 7/2008 |
| JP | 2009-086753 A | 4/2009 |

OTHER PUBLICATIONS

An Office Action issued by the Japanese Patent Office dated Jul. 19, 2016, which corresponds to Japanese Patent pplication No. 2015-028703 and is related to U.S. Appl. No. 15/041,281.

* cited by examiner

*Primary Examiner* — Henry Tsai
*Assistant Examiner* — John B Roche
(74) *Attorney, Agent, or Firm* — Studebaker & Brackett PC

(57) ABSTRACT

A data acquisition system includes an electronic device and a data acquisition terminal. The electronic device includes a data storage section and a first interface. The data acquisition terminal includes a terminal communication control section and a second interface to be connected to the first interface. The terminal communication control section instructs the electronic device to transmit data stored in the data storage section of the electronic device through the first interface. In response to an instruction from the terminal communication control section, the electronic device transmits the data stored in the data storage section to the data acquisition terminal by a predetermined communication scheme. The predetermined communication scheme is a communication scheme that uses a communication standard prescribed in a (Continued)

layer lower than an application layer in an open systems interconnection reference model.

6 Claims, 5 Drawing Sheets

DATA ACQUISITION SYSTEM, ELECTRONIC DEVICE, AND DATA ACQUISITION TERMINAL

INCORPORATION BY REFERENCE

The present application claims priority under 35 U.S.C. § 119 to Japanese Patent Application No. 2015-028703, filed on Feb. 17, 2015. The contents of this application are incorporated herein by reference in their entirety.

BACKGROUND

The present disclosure relates to data acquisition systems, electronic devices, and data acquisition terminals.

An image forming apparatus that is an example of electronic devices stores therein data such as log information, apparatus identification information, and personal information managed by a user. The data may be utilized in an external device such as a computer, another image forming apparatus, etc.

A technique has been proposed in which a data acquisition terminal acquires data stored in an image forming apparatus through connection of a universal serial bus (USB) interface of the data acquisition terminal to a USB interface of the image forming apparatus, for example. Specifically, the image forming apparatus includes a storage section, a data acquisition circuit that acquires data stored in the storage section, and a USB controller that controls communication in compliance with a USB standard. Hereinafter, communication in compliance with the USB standard may be referred to as USB communication.

The storage section, the data acquisition circuit, and the USB controller are boarded on a main circuit board of the image forming apparatus. Through execution of an application for controlling the USB communication by the USB controller, the data stored in the storage section is transmitted to the data acquisition terminal via the data acquisition circuit. The application for controlling the USB communication may be referred to as a USB application.

SUMMARY

A data acquisition system according to the present disclosure includes an electronic device and a data acquisition terminal. The electronic device includes a data storage section, a first interface, a data acquisition circuit, and a power source control circuit. The data storage section stores data therein. The data acquisition terminal is to be connected to the first interface. The data acquisition circuit acquires the data from the data storage section. When electric power is supplied from the data acquisition terminal through the first interface, the power source control circuit supplies the electric power supplied from the data acquisition terminal to the data acquisition circuit. The data acquisition terminal includes a second interface, a power supply section, and a terminal communication control section. The second interface is to be connected to the first interface. The power supply section supplies the electric power to the power source control circuit through the second interface and the first interface. The terminal communication control section instructs the data acquisition circuit to transmit through the first interface, the data that the data acquisition circuit has acquired from the data storage section. In response to an instruction from the terminal communication control section, the data acquisition circuit acquires the data stored in the data storage section and transmits the data acquired from the data storage section to the data acquisition terminal by a predetermined communication scheme. The predetermined communication scheme is a communication scheme that uses a communication standard prescribed in a layer lower than an application layer in an open systems interconnection reference model.

An electronic device according to the present disclosure performs data communication with a data acquisition terminal. The electronic device includes a data storage section, an interface, a data acquisition circuit, and a power source control circuit. The data storage section stores data therein. The data acquisition terminal is to be connected to the interface. The data acquisition circuit acquires the data from the data storage section. When electric power is supplied from the data acquisition terminal through the interface, the power source control circuit supplies the electric power supplied from the data acquisition terminal to the data acquisition circuit. In response to an instruction from the data acquisition terminal, the data acquisition circuit acquires the data stored in the data storage section and transmits the data acquired from the data storage section to the data acquisition terminal through the interface by a predetermined communication scheme. The predetermined communication scheme is a communication scheme that uses a communication standard prescribed in a layer lower than an application layer in an open systems interconnection reference model.

A data acquisition terminal according to the present disclosure performs data communication with an electronic device by a predetermined communication scheme. The data acquisition terminal includes an interface, a power supply section, and a terminal communication control section. The electronic device is to be connected to the interface. The power supply section supplies electric power to the electronic device through the interface. The terminal communication control section instructs the electronic device to transmit data stored in the electronic device. The predetermined communication scheme is a communication scheme that uses a communication standard prescribed in a layer lower than an application layer in an open systems interconnection reference model.

DETAILED DESCRIPTION

Figure 1:
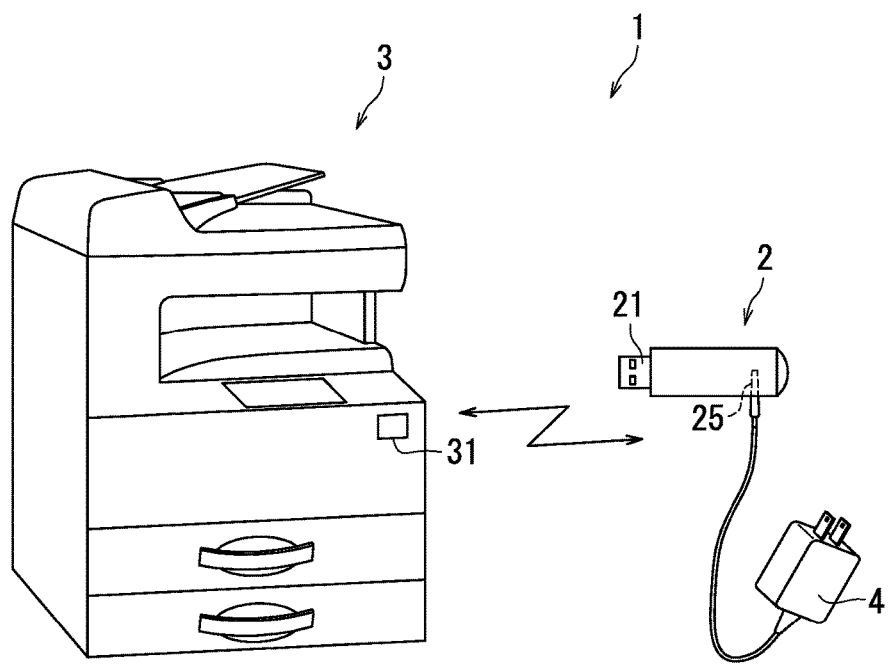
FIG. 1 is a conceptual diagram illustrating a data acquisition system according to an embodiment of the present disclosure.

With reference to the accompanying drawings, a description will be made about a data acquisition system, an electronic device, and a data acquisition terminal according to an embodiment of the present disclosure. In the drawings, like reference signs represent similar or corresponding components and description thereof is not repeated.

Referring to FIG. 1, a configuration of a data acquisition system 1 will be described first. FIG. 1 is a conceptual diagram illustrating the data acquisition system 1. The data acquisition system 1 is a system in which a data acquisition terminal 2 acquires data stored in an image forming apparatus 3.

As illustrated in FIG. 1, the data acquisition system 1 includes the data acquisition terminal 2, the image forming apparatus 3, and an AC adaptor 4 that supplies electric power to the data acquisition terminal 2. The image forming apparatus 3 is an example of an electronic device. The AC adaptor 4 is an example of an external power source device. In the present embodiment, the image forming apparatus 3 is a multifunction peripheral (MFP).

The image forming apparatus 3 includes a universal serial bus (USB) port 31 to which the data acquisition terminal 2 is to be connected. The USB port 31 is an example of a first interface.

The USB port 31 is an interface provided for communication in compliance with a USB standard. Hereinafter, a communication scheme in compliance with the USB standard may be referred to as a USB communication scheme. The USB communication scheme is an example of a second communication scheme. The USB communication scheme is compliant with a communication standard prescribed in a first layer (physical layer) to a seventh layer (application layer) in an open systems interconnection (OSI) reference model.

The USB port 31 is to be connected to a USB connector 21 of the data acquisition terminal 2. The USB port 31 is used for communication between the image forming apparatus 3 and the data acquisition terminal 2. In the present embodiment, the USB port 31 is used in the USB communication and communication in compliance with an inter-integrated circuit ($I^2C$) standard. Hereinafter the communication in compliance with the $I^2C$ standard may be referred to as $I^2C$ communication. Further, a communication scheme in compliance with the $I^2C$ standard may be referred to as an $I^2C$ communication scheme. The $I^2C$ communication scheme is an example of a first communication scheme. The $I^2C$ communication scheme employs a communication standard prescribed in only the first layer (physical layer) in the OSI reference model.

The data acquisition terminal 2 includes a power input section 25 in addition to the USB connector 21.

The USB connector 21 is an interface provided for data communication by the USB communication scheme. The USB connector 21 is an example of a second interface. In the present embodiment, the USB connector 21 is to be connected to the USB port 31 for communication by the $I^2C$ communication scheme and the USB communication scheme.

The power input section 25 is to be connected to the AC adaptor 4. When the AC adaptor 4 is connected to the power input section 25, electric power is supplied from the AC adaptor 4 to the data acquisition terminal 2. When the USB connector 21 of the data acquisition terminal 2 is connected to the USB port 31, the electric power is supplied from the data acquisition terminal 2 to the image forming apparatus 3. Supply of the electric power from the data acquisition terminal 2 to the image forming apparatus 3 enables data communication by the $I^2C$ communication scheme between the data acquisition terminal 2 and the image forming apparatus 3. As a result, the data acquisition terminal 2 is enabled to acquire data stored in the image forming apparatus 3. The data acquisition terminal 2 is used in a situation in which the image forming apparatus 3 is disabled from activating a USB application.

Figure 2:
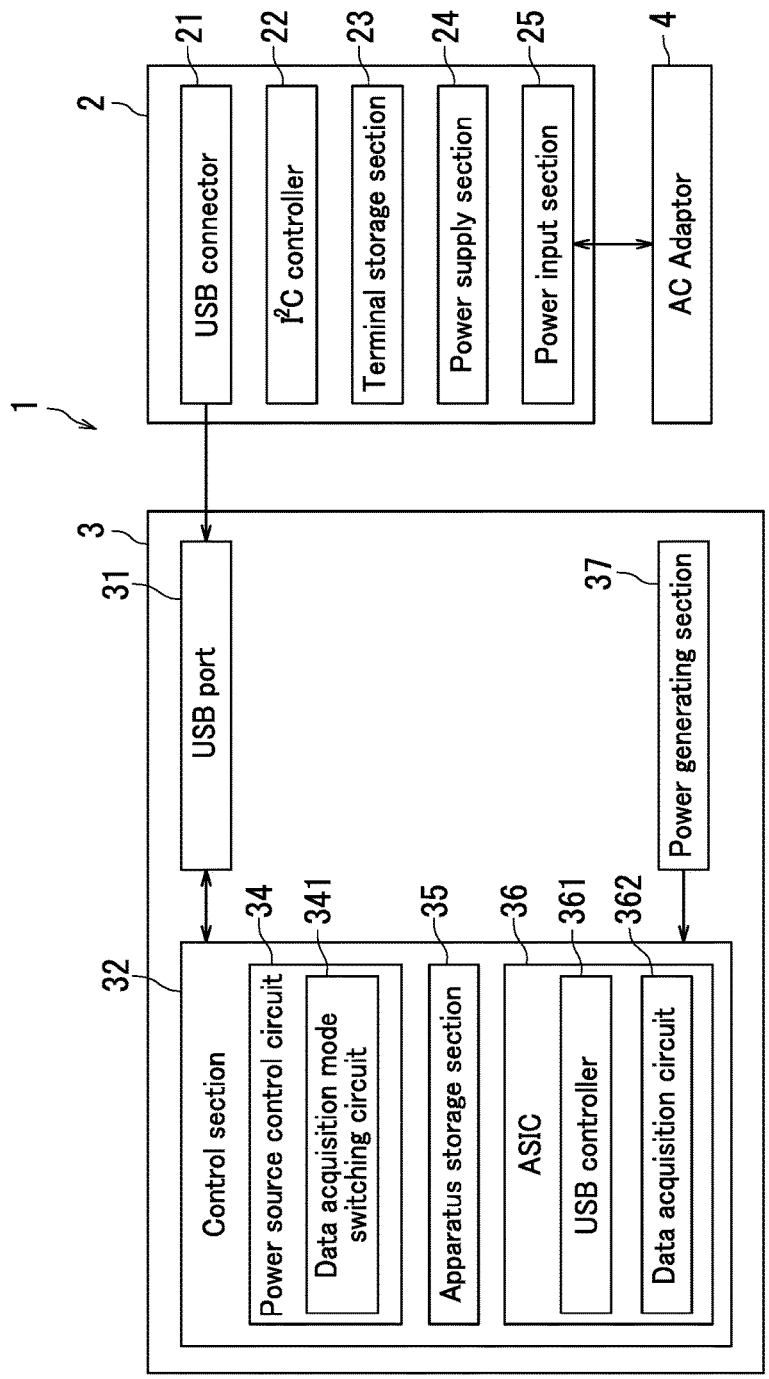
FIG. 2 is a block diagram illustrating a configuration of the data acquisition system according to the embodiment of the present disclosure.

Referring to FIG. 2, the configuration of the data acquisition system 1 will be described next in detail. FIG. 2 is a block diagram illustrating the configuration of the data acquisition system 1.

As illustrated in FIG. 2, the image forming apparatus 3 includes a power generating section 37 and a control section 32 in addition to the USB port 31. The USB port 31, the power generating section 37, and the control section 32 are boarded on a main circuit board of the image forming apparatus 3.

The power generating section 37 generates electric power that is used in respective elements of the control section 32. The power generating section 37 supplies the generated electric power to the control section 32.

The control section 32 includes a power source control circuit 34, an apparatus storage section 35 that is an example of a data storage section, and an application specific integrated circuit (ASIC) 36.

The ASIC 36 executes programs stored in the apparatus storage section 35 to control operation of the respective elements of the image forming apparatus 3. The ASIC 36 includes a data acquisition circuit 362 and a USB controller 361.

The power source control circuit 34 supplies electric power to the data acquisition circuit 362. The power source control circuit 34 includes a data acquisition mode switching circuit 341. The data acquisition mode switching circuit 341 determines whether or not electric power is supplied to the data acquisition mode switching circuit 341 from the data acquisition terminal 2 through the USB port 31. Upon determining that electric power is supplied from the data acquisition terminal 2 to the data acquisition mode switching circuit 341, the data acquisition mode switching circuit 341 supplies the electric power supplied from the data acquisition terminal 2 to the data acquisition circuit 362.

Upon determining that electric power is supplied from the data acquisition terminal 2, the data acquisition mode switching circuit 341 switches a data acquisition mode of the data acquisition circuit 362 from a first mode to a second mode. Specifically, upon determining that electric power is supplied from the data acquisition terminal 2, the data acquisition mode switching circuit 341 transmits a mode switching signal to the data acquisition circuit 362. The data acquisition circuit 362 that has received the mode switching signal switches the data acquisition mode from the first mode to the second mode.

The apparatus storage section 35 includes a read only memory (ROM), a random access memory (RAM), and a hard disk drive (HHD). The apparatus storage section 35 stores various types of data therein. In the present embodiment, the apparatus storage section 35 stores therein programs, image data, log information, counter information, a media access control (MAC) address, an internet protocol (IP) address, and personal information.

The USB controller 361 executes programs (application) stored in the apparatus storage section 35 to control the USB communication through the USB port 31.

The data acquisition circuit 362 acquires data stored in the apparatus storage section 35. Upon receiving the mode switching signal, the data acquisition mode of the data acquisition circuit 362 is switched from the first mode to the second mode. The first mode is a mode in which data communication by the USB communication scheme is enabled. The second mode is a mode in which data communication by the $I^2C$ communication scheme is enabled.

The data acquisition circuit 362 of which data acquisition mode has been switched to the second mode is connected directly to the USB port 31. When the data acquisition mode of the data acquisition circuit 362 is the first mode, the data acquisition circuit 362 transmits the data acquired from the apparatus storage section 35 to the USB port 31 through the USB controller 361.

The data acquisition terminal 2 will be described next. The data acquisition terminal 2 includes an I²C controller 22, a terminal storage section 23, and a power supply section 24 in addition to the USB connector 21 and the power input section 25.

When the power input section 25 is connected to the AC adaptor 4, the power input section 25 supplies electric power supplied from the AC adaptor 4 to the power supply section 24.

The I²C controller 22 that is an example of a terminal communication control section instructs the data acquisition circuit 362 to transmit data through the USB connector 21 and the USB port 31. In response to the instruction, the data acquisition circuit 362 acquires the data stored in the apparatus storage section 35. The data acquisition circuit 362 transmits the data acquired from the apparatus storage section 35 to the data acquisition terminal 2 through the USB port 31.

The terminal storage section 23 stores the data transmitted from the image forming apparatus 3. The terminal storage section 23 is a semiconductor non-volatile memory such as a flash ROM. However, the terminal storage section 23 is not limited to being a semiconductor non-volatile memory. The terminal storage section 23 may be a HDD, for example.

The power supply section 24 supplies the electric power supplied from the power input section 25 to the image forming apparatus 3 through the USB connector 21. In the present embodiment, the power supply section 24 supplies electric power at a voltage of 5 V to the image forming apparatus 3.

Figure 3:
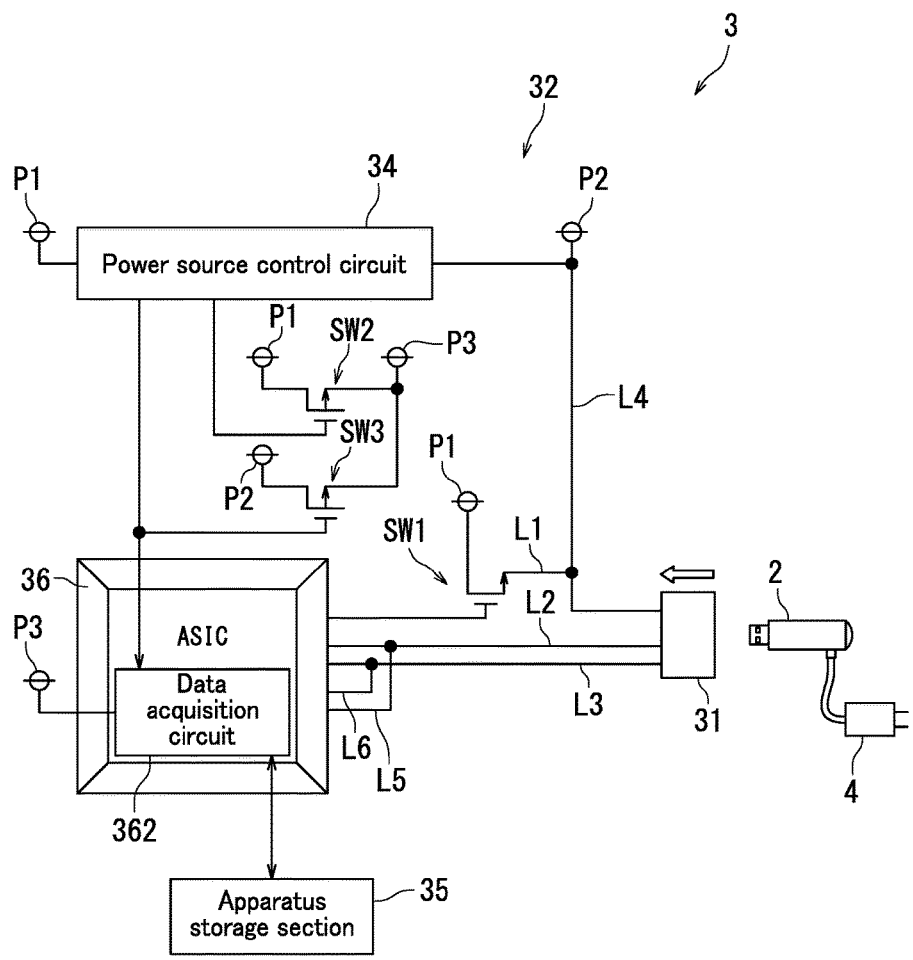
FIG. 3 is a circuit diagram illustrating a configuration of an image forming apparatus according to the embodiment of the present disclosure.

Referring next to FIGS. 2 and 3, a description will be made about a configuration of the image forming apparatus 3. FIG. 3 is a circuit diagram illustrating the configuration of the image forming apparatus 3.

As illustrate in FIG. 3, the image forming apparatus 3 includes the USB port 31, the power source control circuit 34, the apparatus storage section 35, and the ASIC 36.

The image forming apparatus 3 further includes a first switching element SW1, a second switching element SW2, and a third switching element SW3. In the present embodiment, each of the first switching element SW1, the second switching element SW2, and the third switching element SW3 is an N-channel MOSFET.

As illustrated in FIG. 3, the USB port 31 is connected to a first power source line P1 via a first VBUS line L1. The first power source line P1 is connected to the power generating section 37. The first switching element SW1 controls conduction of the first VBUS line L1. In a situation in which the first switching element SW1 is in an on state, electric power is supplied from the first power source line P1 to the USB port 31. By contrast, in a situation in which the first switching element SW1 is in an off state, no electric power is supplied from the first power source line P1 to the USB port 31. Operation of the first switching element SW1 is controlled according to signals from the ASIC 36. The USB port 31 is connected to the ASIC 36 through first differential signal lines L2 and L3.

When a typical USB memory is connected to the USB port 31 in a situation in which the USB controller 361 is enabled to execute the USB application, electric power is supplied to the USB memory via the first VBUS line L1. Further, the ASIC 36 is enabled to transmit data to the USB memory through the first differential signal lines L2 and L3. Hereinafter, a state in which the USB controller 361 is enabled to execute the USB application is referred to as a normal state.

By contrast, when the USB controller 361 is disabled from executing the USB application due to breakage of part around the ASIC 36 on the main circuit board, the first switching element SW1 becomes in the off state. Hereinafter, a state in which the USB controller 361 is disabled from executing the USB application is referred to as an abnormal state.

The USB port 31 is electrically connected to a second VBUS line L4. One end of the second VBUS line L4 is connected to the first VBUS line L1. Specifically, the one end of the second VBUS line L4 is connected to the first VBUS line L1 between the USB port 31 and the first switching element SW1. The other end of the second VBUS line L4 is connected to a second power source line P2 and the power source control circuit 34. The power source control circuit 34 is also connected to the first power source line P1.

When the data acquisition terminal 2 is connected to the USB port 31 in the abnormal state, electric power is supplied from the data acquisition terminal 2 to the power source control circuit 34 and the second power source line P2 via the second VBUS line L4.

The power source control circuit 34 controls each operation of the second switching element SW2 and the third switching element SW3.

In the normal state, the power source control circuit 34 sets the second switching element SW2 in the on state and the third switching element SW3 in the off state. As a result, electric power is supplied from the first power source line P1 to a third power source line P3. The third power source line P3 supplies the electric power to the data acquisition circuit 362.

By contrast, in the abnormal state, the data acquisition mode switching circuit 341 of the power source control circuit 34 determines whether or not electric power is supplied from the data acquisition terminal 2. Upon the data acquisition mode switching circuit 341 determining that electric power is supplied from the data acquisition terminal 2, the power source control circuit 34 sets the third switching element SW3 in the on state and the second switching element SW2 in the off state. As a result, electric power is supplied from the second power source line P2 to the third power source line P3. The third power source line P3 supplies the electric power to the data acquisition circuit 362.

Upon determining that electric power is supplied from the data acquisition terminal 2, the data acquisition mode switching circuit 341 transmits the mode switching signal to the data acquisition circuit 362. The data acquisition circuit 362 that has received the mode switching signal transitions to a state in which the I²C communication with the data acquisition terminal 2 is enabled (switches the data acquisition mode from the first mode to the second mode). As a result, the data acquisition circuit 362 is connected to the first differential signal lines L2 and L3 via second differential signal lines L5 and L6, respectively.

Figure 4:
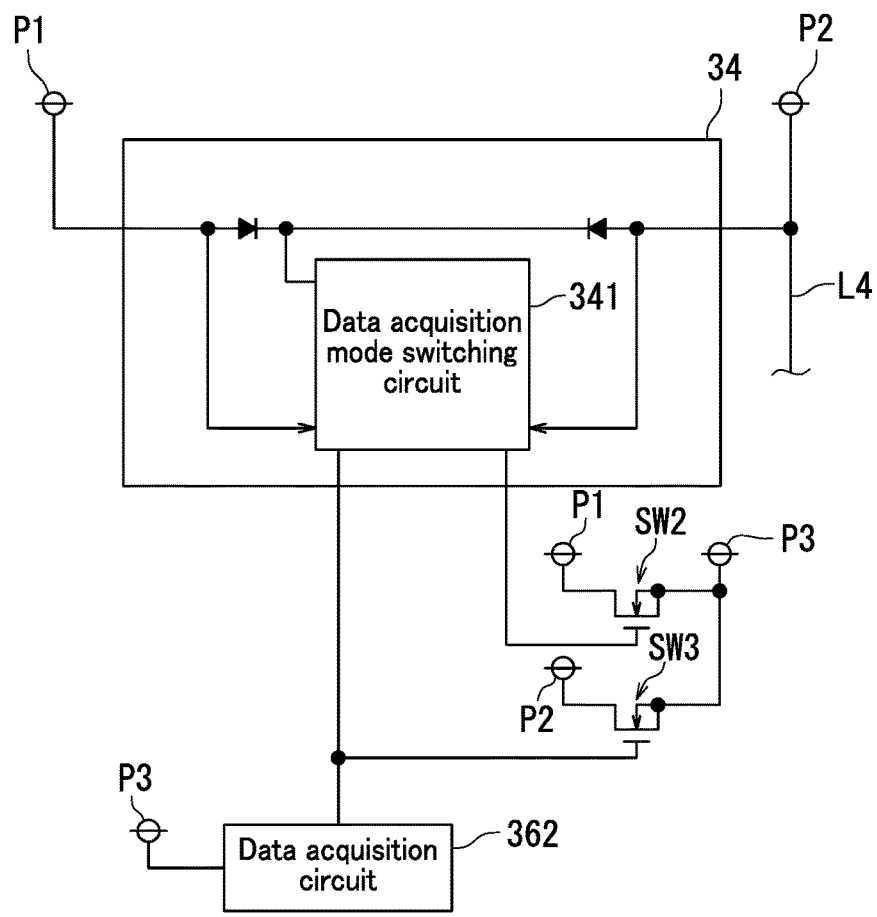
FIG. 4 is a circuit diagram illustrating a configuration of a power source control circuit in FIG. 3.

Referring next to FIG. 4, a description will be made about a configuration of the power source control circuit 34. FIG. 4 is a circuit diagram illustrating the configuration of the power source control circuit 34.

In the normal state, the data acquisition mode switching circuit 341 sets the second switching element SW2 in the on state and the third switching element SW3 in the off state. As a result, electric power is supplied from the first power source line P1 to the third power source line P3. The third power source line P3 supplies the electric power to the data acquisition circuit 362. That is, the electric power is supplied from the power generating section 37 to the data acquisition circuit 362.

By contrast, when the USB connector 21 is connected to the USB port 31 in the abnormal state, electric power is supplied from the data acquisition terminal 2 to the data acquisition mode switching circuit 341. In response to supply of the electric power from the data acquisition terminal 2, the data acquisition mode switching circuit 341 sets the third switching element SW3 in the on state and the second switching element SW2 in the off state. As a result, the electric power is supplied from the second power source line P2 to the third power source line P3. The third power source line P3 supplies the electric power to the data acquisition circuit 362. That is, the electric power is supplied from the data acquisition terminal 2 to the data acquisition circuit 362.

Figure 5:
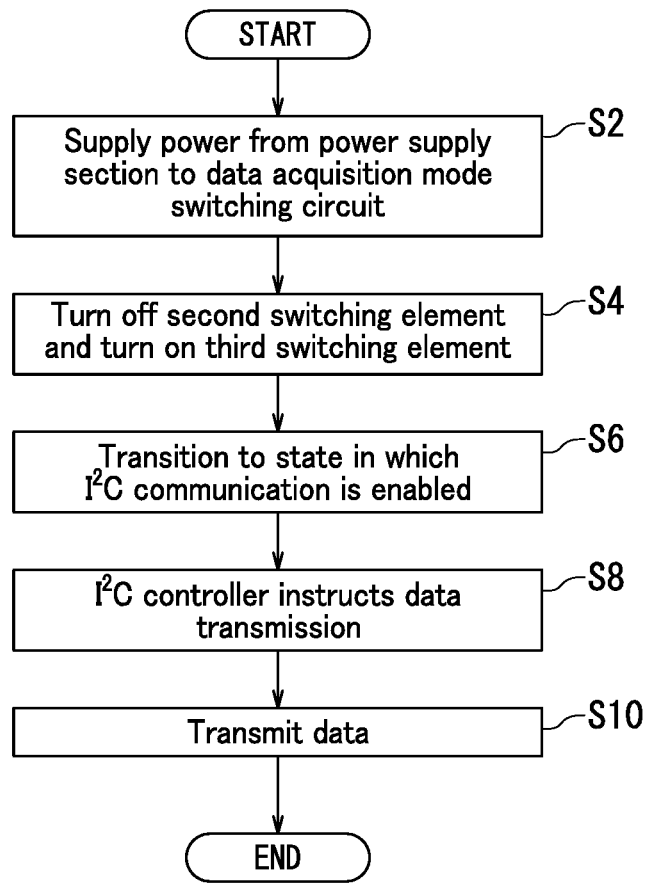
FIG. 5 is a flowchart depicting operation of the data acquisition system according to the embodiment of the present disclosure.

In addition, a signal input from the data acquisition mode switching circuit 341 to the third switching element SW3 that is a signal for controlling the operation of the third switching element SW3 is transmitted also to the data acquisition circuit 362. The signal is input to the data acquisition circuit 362 as the mode switching signal. Operation of the data acquisition system 1 will be described next with reference to FIGS. 1-5. FIG. 5 is a flowchart depicting the operation of the data acquisition system 1. Specifically, FIG. 5 is a flowchart depicting operation of the data acquisition system 1 in the abnormal state.

When a user connects the USB connector 21 of the data acquisition terminal 2 to the USB port 31, the power supply section 24 supplies electric power to the data acquisition mode switching circuit 341 through the USB connector 21 and the USB port 31 (Step S2), as depicted in FIG. 5. The electric power supplied from the data acquisition terminal 2 is supplied also to the second power source line P2.

When the electric power is supplied from the data acquisition terminal 2 to the data acquisition mode switching circuit 341, the data acquisition mode switching circuit 341 sets the third switching element SW3 in the on state and the second switching element SW2 in the off state (Step S4). As a result, supply of the electric power from the data acquisition terminal 2 to the data acquisition circuit 362 starts. Further, the data acquisition mode switching circuit 341 transmits the mode switching signal to the data acquisition circuit 362.

In response to receipt of the mode switching signal, the data acquisition circuit 362 transitions to a state in which the I²C communication is enabled (Step S6). That is, the data acquisition circuit 362 is directly connected to the USB port 31.

When the data acquisition circuit 362 is directly connected to the USB port 31, a signal instructing data transmission is input from the I²C controller 22 to the data acquisition circuit 362 (Step S8). In accordance with the instruction from the I²C controller 22, the data acquisition circuit 362 acquires data stored in the apparatus storage section 35 and transmits the acquired data to the data acquisition terminal 2 (Step S10).

An embodiment of the present disclosure has been described so far. In the present embodiment, even in a situation in which activation of the USB application is disabled due to for example a breakage of part of the main circuit board of the image forming apparatus 3, the data acquisition terminal 2 can acquire data stored in the image forming apparatus 3.

The USB port 31 is an interface used in data communication by the USB communication scheme. A typical image forming apparatus includes a USB port. Accordingly, the data acquisition system 1 can utilize an existing interface of the image forming apparatus. For this reason, it is unnecessary to provide an additional interface dedicated for data acquisition in the image forming apparatus 3.

Further, in the present embodiment, even in a situation in which no electric power is supplied to the data acquisition circuit 362 from the power generating section 37, electric power can be supplied to the data acquisition circuit 362 from the data acquisition terminal 2. In the above configuration, even in a situation for example in which the power generating section 37 is broken, the data acquisition terminal 2 can acquire data stored in the image forming apparatus 3. Data that the data acquisition terminal 2 has acquired is stored into the terminal storage section 23 of the data acquisition terminal 2. The data stored in the terminal storage section 23 can be transmitted to an electronic device different from the image forming apparatus 3 through data communication by the USB communication scheme through the USB connector 21. Thus, convenience for a user can be improved.

An embodiment of the present disclosure has been described so far with reference to the drawings (FIGS. 1-5). However, the present disclosure is not limited to the above embodiment and various alterations may be made without departing from the spirit and the scope of the present disclosure.

For example, the embodiment of the present disclosure describes an example in which the I²C communication scheme is employed for data communication between the data acquisition terminal 2 and the image forming apparatus 3, which however should not be taken to limit the present disclosure. Alternatively, a communication scheme in compliance with for example a universal asynchronous receiver transmitter (UART) standard may be employed for data communication between the data acquisition terminal 2 and the image forming apparatus 3.

The embodiment of the present disclosure describes an example in which the AC adaptor 4 is used as an external power source device, which however should not be taken to limit the present disclosure. Alternatively, a chargeable storage battery such as a mobile battery may be used as the external power source device, for example.

The AC adaptor 4 supplies electric power to the data acquisition terminal 2 in the embodiment of the present disclosure, which however should not be taken to limit the present disclosure. For example, the data acquisition terminal 2 may include an internal battery. In the above configuration, the power supply section 24 can supply electric power supplied from the internal battery to the image forming apparatus 3.

The embodiment of the present disclosure describes an example in which each of the first switching element SW1, the second switching element SW2, and the third switching element SW3 is an N-channel MOSFET, which however should not be taken to limit the present disclosure. Alternatively, each of the first switching element SW1, the second switching element SW2, and the third switching element SW3 may be a bipolar transistor, for example.

The embodiment of the present disclosure describes an example in which the data acquisition circuit 362 acquires data stored in the apparatus storage section 35, which however should not be taken to limit the present disclosure. Alternatively, the data acquisition circuit 362 may acquire data stored in a register of the ASIC 36, for example.

The embodiment of the present disclosure describes the multifunction peripheral as an example of the electronic device in the data acquisition system 1. However, the present disclosure is applicable to copiers, facsimile machines, printers, etc.

The embodiment of the present disclosure describes the data acquisition system 1 including the image forming apparatus 3 as an example. However, the present disclosure is applicable to any electronic device other than the image forming apparatus 3. For example, the present disclosure may be applied to an electronic device such as a personal computer.

What is claimed is:

1. A data acquisition system comprising an electronic device, a data acquisition terminal, and an external power source device that supplies electric power to the data acquisition terminal, wherein
the electronic device includes:
a semiconductor integrated circuit including a data acquisition circuit and a universal serial bus (USB) controller;
a power generating section that generates electric power to be used in the semiconductor integrated circuit;
a data storage section that stores data therein;
a first interface to which the data acquisition terminal is to be connected;
two signal lines to be connected to the first interface;
a VBUS line to be connected to the first interface;
a switching element that switches a supply source of electric power to be used in the data acquisition circuit between the power generating section and the VBUS line; and
a power source control circuit that controls operation of the switching element according to whether or not electric power is supplied to the VBUS line from the data acquisition terminal through the first interface,
the data acquisition circuit acquires the data from the data storage section and transmits the acquired data to the data acquisition terminal through the two signal lines and the first interface by a first communication scheme,
the USB controller transmits the data acquired by the data acquisition circuit to the data acquisition terminal through the two signal lines and the first interface by a second communication scheme,
the data acquisition terminal includes:
a second interface to be connected to the first interface;
a power input section to be connected to the external power source device;
a power supply section configured to supply, when electric power is input to the power input section from the external power source device, the input electric power to the VBUS line through the second interface and the first interface; and
a terminal communication control section configured to instruct, when electric power is input to the power input section from the external power source device, the data acquisition circuit to transmit by the first communication scheme, the data that the data acquisition circuit has acquired from the data storage section,
when electric power is supplied from the data acquisition terminal to the VBUS line, the power source control circuit controls the operation of the switching element so that electric power is supplied to the data acquisition circuit from the VBUS line,
in a situation in which the supply source of electric power to the data acquisition circuit is the VBUS line, in response to an instruction from the terminal communication control section, the data acquired from the data storage section is transmitted to the data acquisition terminal by the first communication scheme,
in a situation in which the supply source of electric power to the data acquisition circuit is the power generating section, the data acquired from the data storage section is transmitted to the data acquisition terminal by the second communication scheme,
the first communication scheme is a communication scheme that uses a communication standard prescribed in a layer lower than an application layer in an open systems interconnection reference model, and
the second communication scheme is a communication scheme based on a USB standard.

2. The data acquisition system according to claim 1, wherein
the first communication scheme uses a communication standard prescribed in only a physical layer of the open systems interconnection reference model.

3. The data acquisition system according to claim 2, wherein
the first communication scheme is compliant with an inter-integrated circuit (I$^2$C) standard.

4. The data acquisition system according to claim 1, wherein
the electronic device is an image forming apparatus.

5. An electronic device that performs data communication with a data acquisition terminal, comprising:
a semiconductor integrated circuit including a data acquisition circuit and a universal serial bus (USB) controller;
a power generating section that generates electric power to be used in the semiconductor integrated circuit;
a data storage section that stores data therein;
an interface to which the data acquisition terminal is to be connected;
two signal lines to be connected to the interface;
a VBUS line to be connected to the interface and to which electric power is supplied from the data acquisition terminal;
a switching element that switches a supply source of electric power to be used in the data acquisition circuit between the power generating section and the VBUS line; and
a power source control circuit configured to control operation of the switching element according to whether or not electric power is supplied from the data acquisition terminal to the VBUS line, wherein
the data acquisition circuit acquires the data from the data storage section and transmits the acquired data to the data acquisition terminal through the two signal lines and the interface by a first communication scheme,
the USB controller transmits the data acquired by the data acquisition circuit to the data acquisition terminal through the two signal lines and the interface by a second communication scheme
when electric power is supplied to the VBUS line from the data acquisition terminal, the power source control circuit controls operation of the switching element so that electric power is supplied from the VBUS line to the data acquisition circuit, in a situation in which the supply source of electric power to the data acquisition circuit is the VBUS line, in response to an instruction from the data acquisition terminal, the data acquired from the data storage section is transmitted to the data acquisition terminal by the first communication scheme, in a situation in which the supply source of electric power to the data acquisition circuit is the power generating section, the data acquired from the data storage section is transmitted to the data acquisition terminal by a second scheme, the first communication scheme is a communication scheme that uses a communication standard prescribed in a layer lower than an application layer in an open systems interconnection reference model, and the second communication scheme is a communication scheme based on a UBS standard.

6. A data acquisition terminal that performs data communication with an electronic device by either one of a first communication scheme and a second communication scheme, the electronic device including:
a semiconductor integrated circuit including a data acquisition circuit and a universal serial bus (USB) controller;
a power generating circuit that generates electric power to be used in the semiconductor integrated circuit;
a data storage section that stores data therein;
a first interface to which the data acquisition terminal is to be connected;
two signal lines to be connected to the first interface;
a VBUS line to be connected to the first interface;
a switching element that switches a supply source of electric power to be used in the data acquisition circuit between the power generating section and the VBUS line; and
a power source control circuit configured to control operation of the switching element according to whether or not electric power is supplied to the VBUS line from the data acquisition terminal through the first interface, the data acquisition circuit acquiring the data from the data storage section and transmitting the acquired data to the data acquisition terminal through the two signal lines and the first interface by a first communication scheme, the USB controller transmitting the data acquired by the data acquisition circuit to the data acquisition terminal through the two signal lines and the first interface by a second communication scheme the data acquisition terminal comprising:
a second interface to which the first interface is to be connected;
a terminal storage section that stores the data therein;
a power input section to which electric power is input from an external power source device:
a power supply section configured to supply, when electric power is supplied to the power input section, the electric power input to the power input section to the VBUS line through the first interface and the second interface; and
a terminal communication control section configured to instruct, when electric power is input to the power input section, the data acquisition circuit to transmit the data acquired by the data acquisition circuit from the data storage section by the first communication scheme, wherein when electric power is supplied from the data acquisition terminal to the VBUS line, the power source control circuit control operation of the switching element so that electric power is supplied from the VBUS line to the data acquisition circuit, in a situation in which the supply source of electric power to the data acquisition circuit is the VBUS line, in response to an instruction from the terminal communication control section, the data acquired from the data storage section is transmitted to the data acquisition terminal by the first communication scheme, in a situation in which the supply source of electric power to the data acquisition circuit is the power generating section, the data acquired from the data storage section is transmitted to the data acquisition terminal by the second communication scheme, data transmitted to the second interface from the electronic device by either one of the first communication scheme and the second communication scheme is stored into the terminal storage section, the first communication scheme is a communication scheme that uses a communication standard prescribed in a layer lower than an application layer in an open systems interconnection reference model, and the second communication scheme is a communication scheme based on a USB standard.

* * * * *